(12) United States Patent
Shirakura et al.

(10) Patent No.: US 7,597,457 B2
(45) Date of Patent: Oct. 6, 2009

(54) LIGHTING APPARATUS

(75) Inventors: Akira Shirakura, Tokyo (JP); Koji Ashizaki, Tokyo (JP); Yoshiaki Kumagai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/683,205

(22) Filed: Mar. 7, 2007

(65) Prior Publication Data
US 2007/0216980 A1 Sep. 20, 2007

(30) Foreign Application Priority Data
Mar. 20, 2006 (JP) ............................ 2006-076095

(51) Int. Cl.
*F21S 6/00* (2006.01)

(52) U.S. Cl. .................. 362/257; 362/29; 362/186; 362/293; 362/311.01; 362/429; 359/1; 359/15; 359/22; 359/32; 359/33

(58) Field of Classification Search .............. 362/29, 362/186, 257, 293, 311, 429, 806, 311.01, 362/311.03, 311.06; 359/1, 15, 22, 32, 33
See application file for complete search history.

(56) References Cited

U.S. PATENT DOCUMENTS

| | | | | |
|---|---|---|---|---|
| 5,296,948 | A | * | 3/1994 | Chen et al. ............... 359/1 |
| 5,677,701 | A | * | 10/1997 | Okuyama et al. ......... 345/7 |
| 5,822,088 | A | * | 10/1998 | Danno et al. .............. 359/1 |
| 5,951,149 | A | * | 9/1999 | Lee ....................... 362/259 |
| 6,145,229 | A | * | 11/2000 | Able ...................... 40/446 |
| 6,491,395 | B2 | * | 12/2002 | Shirakura et al. ......... 353/7 |
| 6,601,969 | B2 | * | 8/2003 | Barton ................... 362/155 |
| 7,040,775 | B2 | * | 5/2006 | Opolka .................. 362/118 |

FOREIGN PATENT DOCUMENTS

JP 2003-229004 8/2003

* cited by examiner

*Primary Examiner*—Sandra L O'Shea
*Assistant Examiner*—Meghan K Dunwiddie
(74) *Attorney, Agent, or Firm*—K&L Gates LLP

(57) ABSTRACT

A lighting apparatus is provided. The lighting apparatus includes a power supply housing section, a circuit board housing section, a light source housing section, a cutout portion, and a light source. An image recorded on a record medium is displayed in the state that an end portion of the power supply housing section and an end portion of the record medium secured to the cutout portion are placed on a surface where the lighting apparatus is placed.

8 Claims, 13 Drawing Sheets

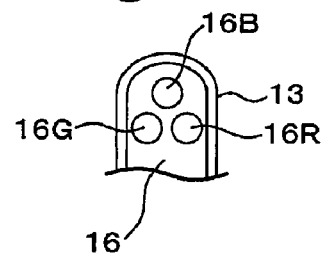
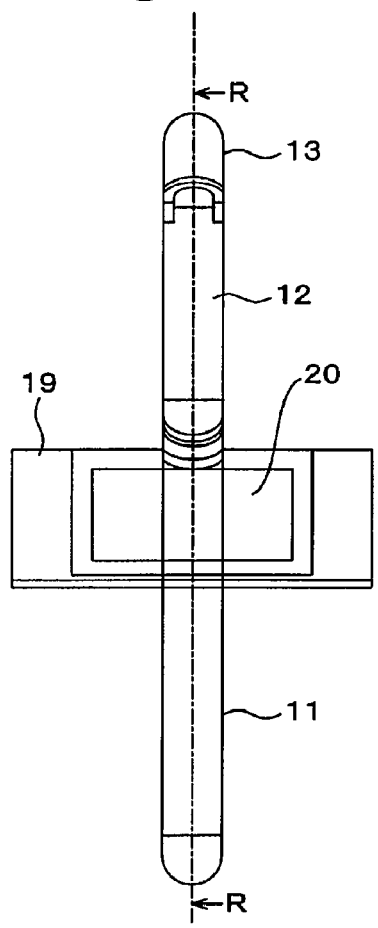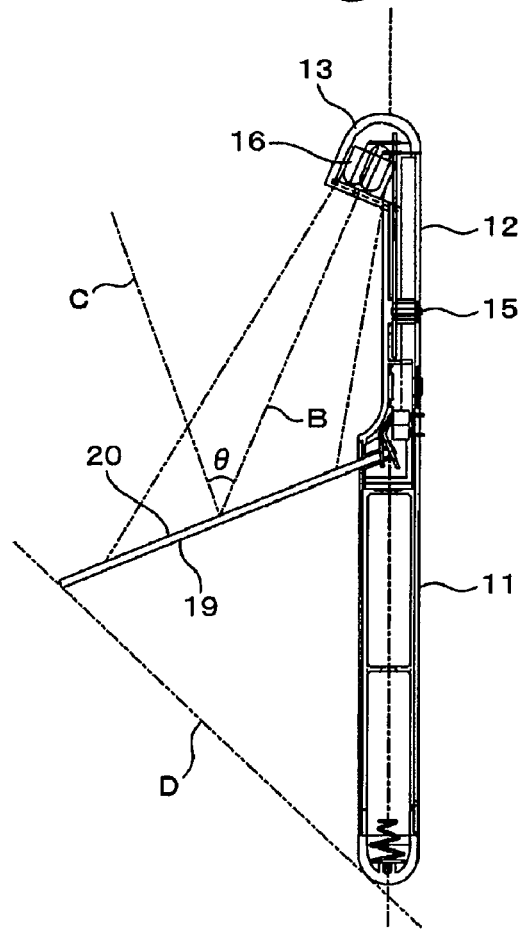

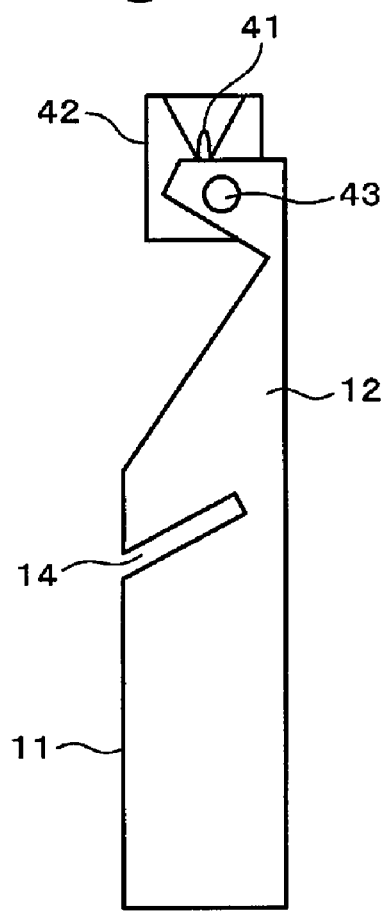 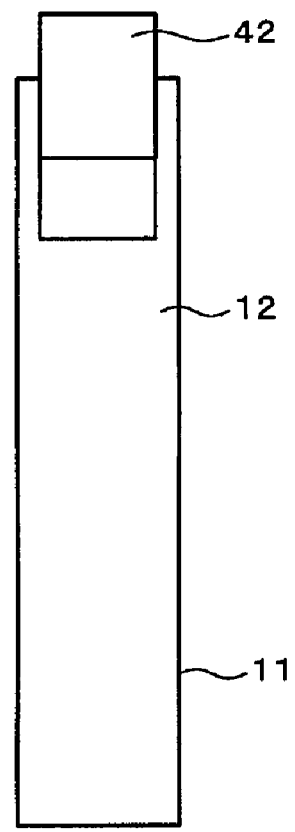

LIGHTING APPARATUS

CROSS REFERENCES TO RELATED APPLICATION

The present application claims priority to Japanese Patent Application JP 2006-076095 filed in the Japanese Patent Office on Mar. 20, 2006, the entire contents of which is being incorporated herein by reference.

BACKGROUND

The present disclosure relates to a lighting apparatus that reproduces, for example, holograms and holographic stereograms that have been created.

A hologram that reproduces a three-dimensional image can be composed of original two-dimensional images of an object viewed from different view points. A holographic stereogram is created by successively recording original images of which one object has been successively photographed for example from different view points as stripe-shaped or dot-shaped element holograms on one hologram record material.

As shown in FIG. 1, in a holographic stereogram having parallax information for example only in the lateral direction, by successively photographing an object 100 from different view points in the lateral direction, a plurality of parallax images 101a to 101e are successively obtained. The parallax images 101a to 101e are linearly focused for example on a hologram record medium 102. With reference light having a predetermined angle, the parallax images 101a to 101e are recorded on the hologram record medium 102. In other words, as shown in FIG. 2, a parallax image sequence D1 is divided in a stripe shape in the parallax direction and stripe-shaped data of different parallax images are reconstructed. By performing the so-called "slice and dice" image process, a hologram image D2 is created. An image recording apparatus successively records stripe-shaped element holograms on the hologram record medium 102, resulting in creating the hologram image D2.

In this holographic stereogram, since image information obtained by successively photographing an object from different view points in the lateral direction is successively recorded as stripe-shaped element holograms in the lateral direction, when a user views this holographic stereogram with both his or her eyes, two dimensional-images in his or her eyes slightly become different. As a result, the user feels a parallax. Thus, a three-dimensional image is reproduced.

A high quality hologram image can be viewed with light emitted in a predetermined direction from a point light source. Instead, by illuminating a hologram image with direct sunlight or a home incandescent lamp, a hologram image can be clearly viewed. However, when a hologram image is viewed outdoor on cloudy or under a fluorescent lamp, the hologram image becomes dimmed. When a hologram image is illuminated with a plurality of incandescent lamps, a plurality of images are viewed. In addition, a high quality hologram image may not be viewed depending on the positional relationship with the light source. Thus, the quality of a hologram image varies depending on various viewing conditions. To solve such a problem, a viewer that fixes the positional relationship between a light source and a hologram, namely a lighting apparatus having a light source with which a hologram image is reproduced, has been proposed. This applies to the case that a holographic stereogram composed of a plurality of element holograms is reproduced.

A lighting apparatus is preferably small in size such that it has portability that allows the apparatus to be used and placed anywhere. In addition, there is a risk of which the positional relationship between a portion at which a hologram or the like is attached and a light source deviates while the lighting apparatus is being carried. If the positional relationship deviates, a hologram image or a holographic stereogram is not reproduced in high quality. Thus, to view a hologram or a holographic stereogram in high quality, it is necessary to keep the positional relationship between the hologram and so forth and the light source such that it usually satisfies an optimum viewing condition.

As such a lighting apparatus, a lighting apparatus 1 as shown in FIG. 3 is described in Japanese Patent Application Laid-Open No. 2003-229004.

The lighting apparatus 1 is composed of a base section 2, an arm section 3 disposed on the base section 2, and a lamp section 4 disposed at an end of the arm section 3. The arm section 3 is composed of two elastic rods 3a and 3b that are horizontally held by a connection portion 6. The lamp section 4 has a light source 4a and a shade 4b that covers the light source 4a. Disposed on the connection portion 6 is a clip 7. The clip 7 holds a hologram card 8. The hologram card 8 is composed of a base material 8a and a holographic stereogram 8b adhered on one surface of the base material 8a.

Such a lighting apparatus has the base section 2 and the lamp section 4 is bulky. Thus, it is difficult to say that the lighting apparatus has excellent portability. In addition, Japanese Patent Application Laid-Open No. 2003-229004 describes a lighting apparatus having a pen-shaped arm section diagonally disposed on the base section. However, since this lighting apparatus has the pen-shaped arm section and a light source section protrudes from the pen-shaped arm section. Thus, it is difficult to say that the lighting apparatus has excellent portability.

In view of the foregoing, it would be desirable to provide a lighting apparatus used to view holograms with excellent portability because of use of a non-protruded light source section and omission of a base section unlike Japanese Patent Application Laid-Open No. 2003-229004.

SUMMARY

According to an embodiment, there is provided a lighting apparatus. The lighting apparatus includes a power supply housing section, a circuit board housing section, a light source housing section, a cutout portion, and a light source. The power supply housing section is composed of a cylindrical sleeve. The power supply housing section houses a battery cell or a contact portion. The shape of the contact portion is nearly identical to that of the battery cell. The contact portion is connected to an external AC adaptor. The circuit board housing section extends from the power supply housing section and houses a circuit board. A part of a circumference surface of the sleeve is cut inwardly. A sectional area of the circuit board housing section is smaller than that of the power supply housing section. The light source housing section is disposed at an end portion of the circuit board housing section. The cutout portion is formed on a near side of the circuit board housing section in the power supply housing section. A part of a planar and inflexible record medium on which a hologram image or a holographic stereogram image was recorded or a part of a holder which holds the record medium is able to be inserted into or removed from the cutout portion. The cutout portion is formed at a predetermined angle corresponding to an incident angle of reference light with which a hologram was recorded. The light source is housed in the light source housing section and emits light to the cutout portion. An image recorded on the record medium is displayed in the state that an end portion of the power supply housing section and an end portion of the record medium secured to the cutout portion are placed on a surface where the lighting apparatus is placed.

According to an embodiment, since the light source housing section does not protrude and an image recorded on a record medium is displayed in the state that the end portion of the power supply housing section and the end portion of the record medium are brought into contact with a surface where the lighting apparatus is placed. Thus, a base section can be omitted. The lighting apparatus is formed in a sleeve shape as a whole with excellent portability. When the lighting apparatus is not used to illuminate a hologram or a holographic stereogram, the lighting apparatus can be devised to be used as a pen light. In an embodiment, in a very simple method of which a hologram or a holder that holds a hologram is inserted into the lighting apparatus, the positional relationship between the light source and the lighting object can be kept in a predetermined condition, anyone can easily illuminate the lighting object with the light source in the predetermined condition, for example an optimal viewing condition for the lighting object.

Additional features and advantages are described herein, and will be apparent from, the following Detailed Description and the figures.

BRIEF DESCRIPTION OF THE FIGURES

FIG. 5A, FIG. 5B, FIG. 5C, and FIG. 5D are a plan view, a front view, and sectional views showing the lighting apparatus according to the embodiment in the state that a lighting object is inserted into a cutout portion;

FIG. 10A and FIG. 10B are a side view and a rear view showing the lighting apparatus according to another embodiment in the case that the lighting apparatus operates in a first operation mode;

DETAILED DESCRIPTION

Next, with reference to the accompanying drawings, embodiments are described. Changes may be made to the following embodiments without departing from the scope and sprit of the present disclosure.

Figure 1:
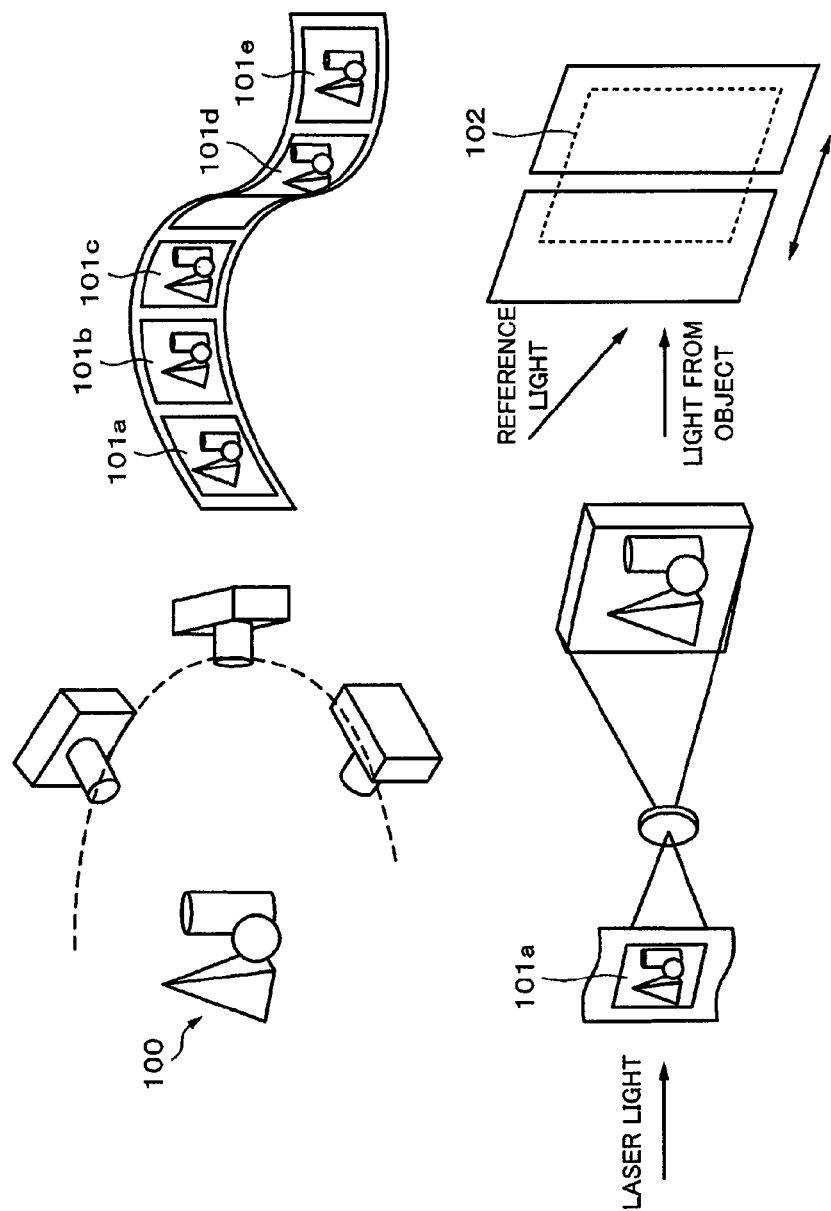
FIG. 1 is a schematic diagram describing a method of creating a regular holographic stereogram.
Figure 2:
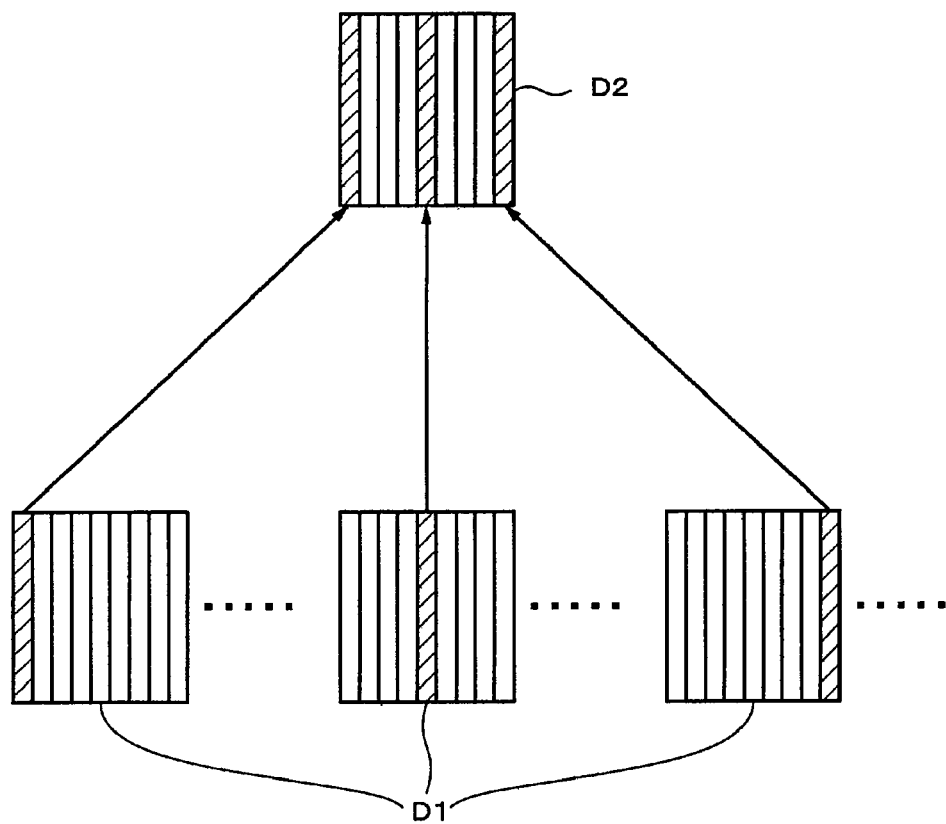
FIG. 2 is a schematic diagram describing an image process performed when a holographic stereogram is created.
Figure 3:
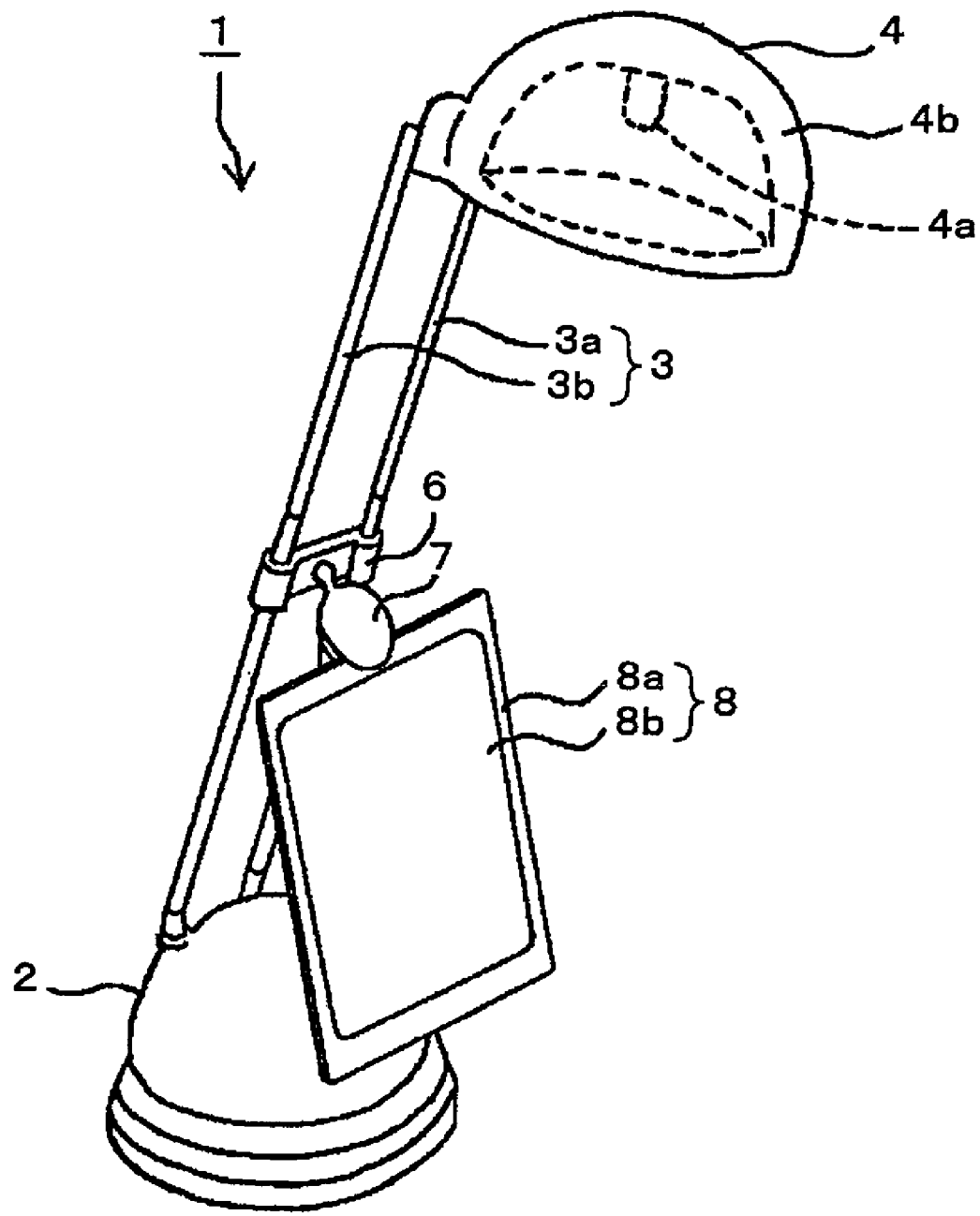
FIG. 3 is a perspective view exemplifying a lighting apparatus that has been proposed.
Figure 4A:
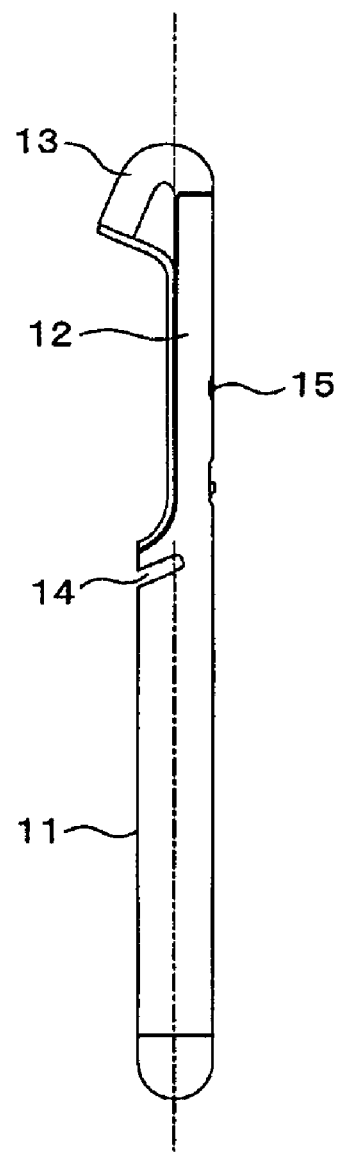
FIG. 4A and FIG. 4B are a side view and a rear view showing a lighting apparatus according to an embodiment.
Figure 4B:
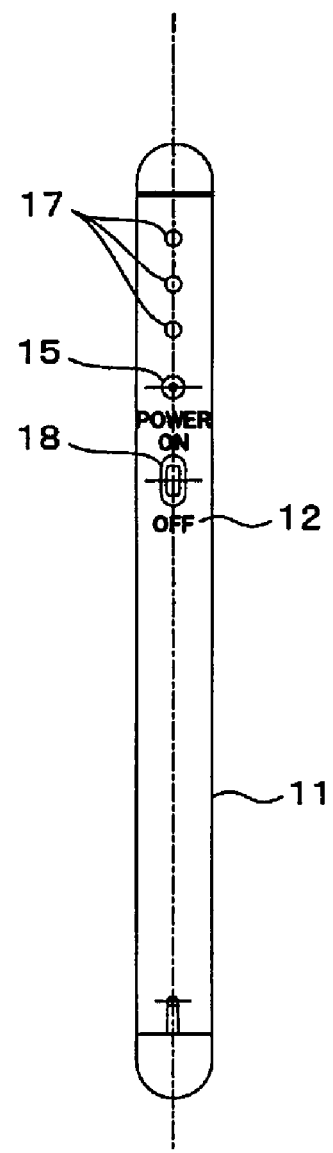

In a lighting apparatus according to an embodiment, a part of a record medium on which a hologram image or a holographic stereogram image has been recoded or a part of a holder that holds the record medium can be inserted into and removed from the lighting apparatus. FIG. 4A and FIG. 4B show the state that the record medium or the holder has not yet been inserted into the lighting apparatus. FIG. 5A to FIG. 5D show the state that the record medium or the holder has been already inserted into the lighting apparatus. FIG. 4A is a side view showing the lighting apparatus. FIG. 4B is a rear view showing the lighting apparatus. FIG. 5A is a top view showing the lighting apparatus. In FIG. 5A, for simplicity, the record medium or the holder is omitted. FIG. 5B is a front view showing the lighting apparatus. FIG. 5C is a sectional view taken along line R-R of FIG. 5B. FIG. 5D is a schematic diagram showing an arrangement of LEDs of a light source 16.

The lighting apparatus according to this embodiment includes a power source housing section 11, a circuit board housing section 12, and a light source housing section 13. The power source housing section 11 has a nearly cylindrical shape. The circuit board housing section 12 extends from the power source housing section 11. A part of the cylindrical sleeve of the circuit board housing section 12 is inwardly cut in a nearly semi-circular shape. The circuit board housing section 12 houses a circuit board. The light source housing section 13 is disposed at an end portion of the circuit board housing section 12. The light source housing section 13 has a sectional area that is slightly larger than the power source housing section 11. These power source housing section 11, circuit board housing section 12, and light source housing section 13 are composed of for example molded products of synthetic resin. These sections are linearly arranged on the same center axis and formed in a sleeve shape as a whole.

Formed on the near side of the circuit board housing section 12 in the power source housing section 11 is a cutout portion 14. The cutout portion 14 is formed by diagonally cutting the circumference of the cylindrical case from a front surface on which a concave portion of the circuit board housing section 12 is formed in the circuit board housing section 12 to a rear surface toward the light source housing section 13.

As shown in FIG. 5C, the power source housing section 11 houses two cylindrical battery cells connected in series. Instead of the battery cells, the power source housing section 11 may house a contact portion that has a battery shape which is nearly identical to that of two batteries connected in series and contact on their both ends such that a DC voltage is supplied from an external AC adaptor. With these contact portions, illumination can be prevented from becoming dirk as the battery cells discharge electricity.

The circuit board housing section 12 houses a stripe-shaped circuit board. The diameter of the stripe-shaped circuit board is slightly smaller than that of the circuit board housing section 12. The circuit board is secured to the circuit board housing section 12 with a screw 15. A control circuit for a light source, for example an LED (Light Emitting Diode), housed in the light source housing section 13 is disposed on the circuit board. It is preferred that the light source have a wave length of a laser with which a hologram was recorded (for example, blue: 476 nm, green: 532 nm, and red: 647 nm). For example, a light source of which a red color LED or laser, a green color LED or laser, and a blue color LED or laser are closely arranged in a Δ shape can be used. Of course, other types of light sources can be used. Examples of these light sources include white LEDs of three-wavelength fluorescent substance excitation type that emit light having three wavelengths of primary three primary colors, white LEDs of three-wavelength fluorescent substance excitation type using blue-violet LEDs or ultraviolet LEDs. Other examples of the light sources include a krypton light source, a xenon light source, and a halogen light source.

In this embodiment, as shown in FIG. 5D, the light source 16 of which three LEDs 16R, 16G, and 16B of red, green, and blue are arranged in a Δ shape is used. It is preferred that the distance between any two of these LEDs be as short as possible. Specifically, it is preferred that the distance between any two of these LEDs be 1/10 or less of the distance between the light source 16 and the cutout portion 14 to prevent these color images from deviating. As shown in FIG. 4B, small holes 17 are formed on the rear surface of the circuit board housing section 12. The amounts of light emitted by these LEDs are adjusted by variable resistors disposed on the circuit board. The variable resistors can be accessed through the small holes 17. By adjusting the amounts of light emitted by these LEDs, the color balance of the three primary colors can be optimized. In addition, as shown in FIG. 4B, a manual control slide switch 18 that switches on/off states of the light source is disposed on the rear surface of the circuit board housing section 12.

In addition, a sensor switch is disposed in the cutout portion 14. The sensor switch is turned on when a hologram card 19 or a hologram holder (which will be described later) is inserted into the cutout portion 14. In this embodiment, the light source 16 is controlled to be turned on only when both the slide switch 18 and the sensor switch are turned on.

The cutout portion 14 that is a record medium holding portion has a groove that has a width for which the hologram card 19 that is a record medium can be held. A part of the hologram card 19 is inserted into the groove of the cutout portion 14. The hologram card 19 is secured with the groove of the cutout portion 14.

As shown in FIG. 5B and FIG. 5C, the hologram card 19 is attached to the cutout portion 14. The hologram card 19 has inflexibility that prevents it from bending even if it is diagonally attached to the cutout portion 14. The hologram card 19 is composed of for example a card-shaped thin plate base material made of plastics or the like and a holographic stereogram 20 that is adhered on one surface of the base material.

Figure 6:
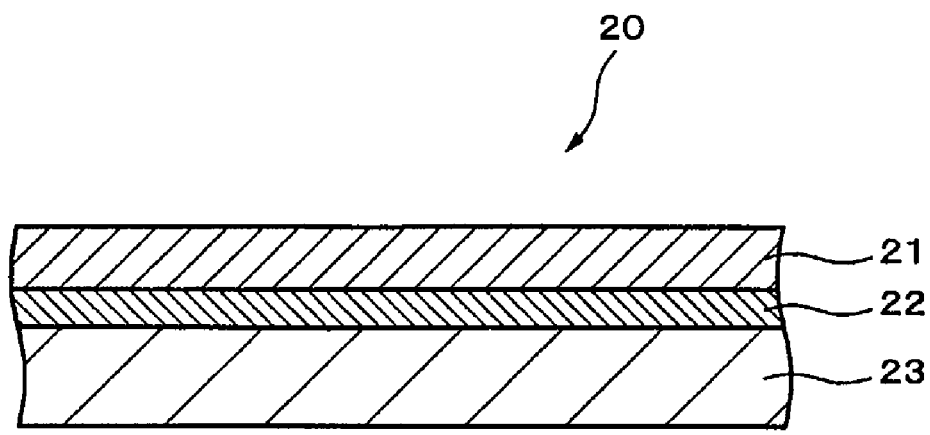
FIG. 6 is a sectional view describing a hologram record medium.

As shown in FIG. 6, specifically, the holographic stereogram 20 is a so-called film-coated type record medium of which a photo-polymer layer 22 made of a photopolymer is formed on a film base material 21 and then a cover sheet 23 is coated on the photo-polymer layer 22. A plurality of images having parallax information are recorded on the record medium.

Figure 7A:
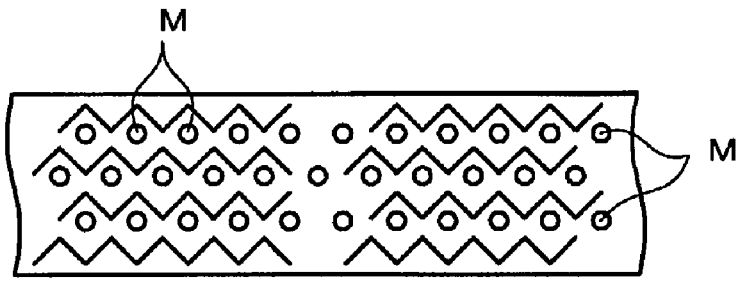
FIG. 7A, FIG. 7B, and FIG. 7C are schematic diagrams describing a photosensitive process for a hologram record medium.
Figure 7B:
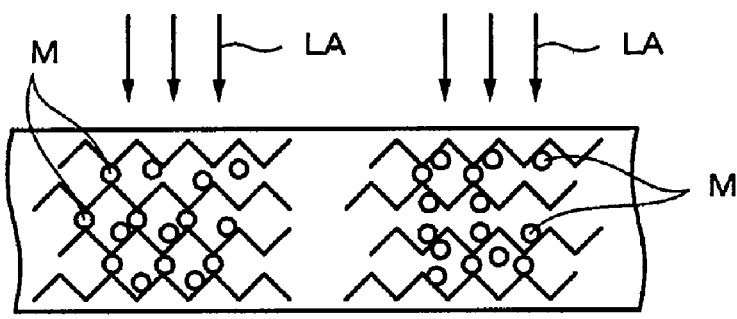
Figure 7C:
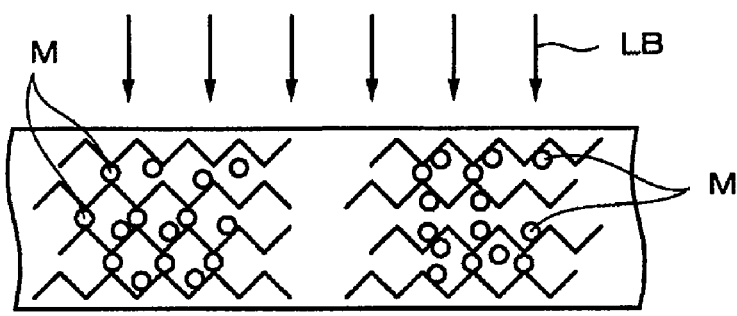

As shown in FIG. 7A, initially in the photopolymer, monomer M is equally dispersed in a matrix polymer. In contrast, when monomer M is illuminated with light LA having a power of around 10 to 400 mJ/cm$^2$, monomer M is polymerized in an exposing unit. As monomer M is polymerized, monomer M is moved, causing the concentration of monomer M to vary at each position. As a result, refraction factor modulation takes place. Thereafter, as shown in FIG. 7C, when the full surface of monomer M is irradiated with ultraviolet light or visible light LB having a power of around 1000 mJ/cm$^2$, the monomer M is fully polymerized. Thus, in the photopolymer, the refraction factor varies with incident light. As a result, interference fringes that take place due to interference between reference light and light emitted from an object can be recorded as variation of refraction factors.

In this embodiment, the holographic stereogram 20 of which a plurality of images having parallax information have been recorded on a hologram record medium is adhered to the hologram card 19. Instead, a record medium on which a hologram image was recorded or a record medium on which a holographic stereogram image that was processed by so-called morphing process that allows two-dimensional or three-dimensional changes of a plurality of objects can be viewed by moving a view point may be adhered on the base material of the hologram card 19. Instead, when a glass or the like is used, it is not necessary to adhere the record medium onto the base material.

By inserting a part of the hologram card 19 into the cutout portion 14 (attaching the hologram card 19 to the cutout portion 14) and illuminating the hologram card 19 with light of the light source (three LEDs) 16 of the light source housing section 13, a holographic stereogram image is reproduced. Thus, the user can view the reproduced holographic stereogram image.

When the hologram card 19 as a lighting object is attached to the cutout portion 14, as shown in FIG. 5C, a cut angle of the cutout portion 14 is designated such that angle θ between line B that connects the light source 16 and the center of the hologram card 19 and normal line C of the hologram card 19 becomes an angle that satisfies an optimum viewing condition of the hologram. This angle θ corresponds to the incident angle of reference laser light with which the holographic stereogram 20 was recorded. When a hologram card 19 of reflection hologram type is attached to the cutout portion 14 with angle θ of 40 to 55 degrees, a holographic stereogram image can be viewed in high quality.

Thus, in such a simple method of which the hologram card 19 is inserted into the groove of the cutout portion 14 and secured thereto, the hologram card 19 as the lighting object can be attached to the lighting apparatus. In addition, the angle of the groove of the cutout portion 14 is defined such that the positional relationship between the hologram card 19 and the light source 16 satisfies an optimum viewing condition. Thus, by turning on the light source 16 and illuminating the hologram card 19 with light of the light source 16, anyone can easily view a holographic stereogram image in high quality.

In this embodiment, since the cutout portion 14 holds the hologram card 19, unless the hologram card 19 is attached, the holding portion that holds the hologram card 19 does not protrude from the surface of the sleeve. In addition, since the front surface of the circuit board housing section 12 is cut inwardly, light emitted from the light source 16 is not obstructed. Thus, since the light source housing section 13 can be positioned on the rear surface side, the amount of protrusion of the light source housing section 13 from the front surface can be decreased. As a result, the lighting apparatus can be formed in a pen light shape as a whole. Thus, the lighting apparatus according to this embodiment is highly designed for slimness and portability.

Figure 8:
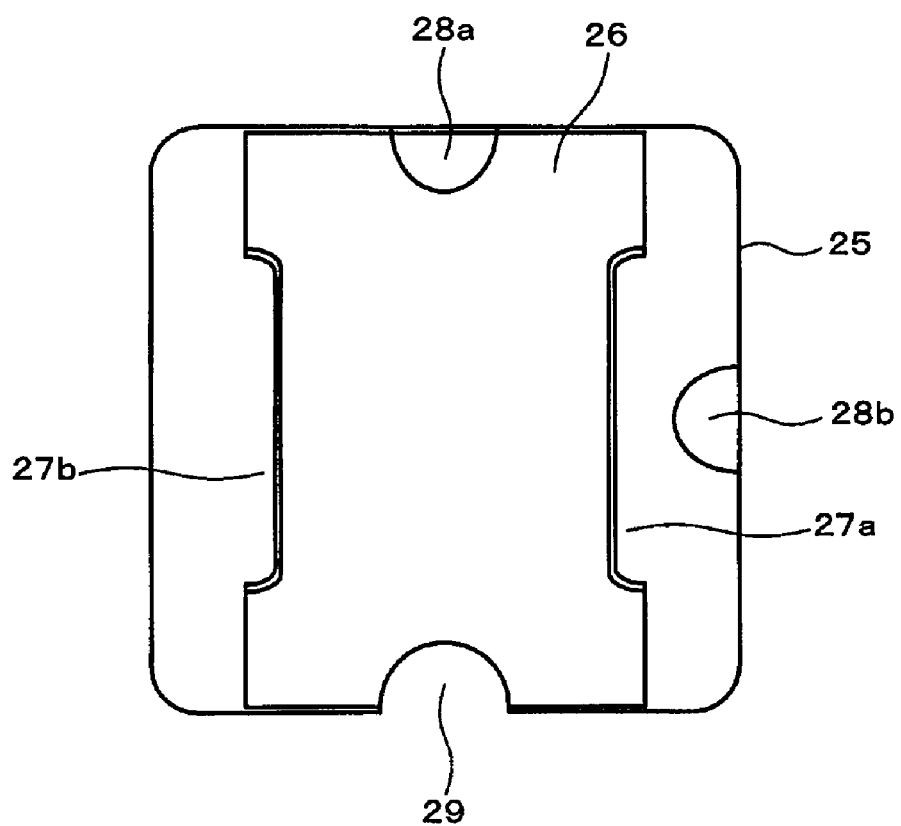
FIG. 8 is a plan view exemplifying a holder that holds a hologram.

Although the hologram card 19 is composed of the base material and the holographic stereogram 20 adhered thereto, if a lighting object is a thin card, it may have a lack of sufficient inflexibility. In this case, as shown in FIG. 8, a holder 25 that holds a lighting object at a predetermined position can be additionally provided.

The holder 25 has a square planar shape as a whole. In the holder 25, a concave portion 26 that houses a hologram card is formed. In the concave portion 26, card holding members 27a and 27b are symmetrically formed. A hologram card is slidably inserted into the concave portion 26 from the top or the bottom thereof and held by the card holding members 27a and 27b. In addition, thin wall semicircular fitting members 28a and 28b that are inserted into the cutout portion 14 and a semicircular cutout portion 29 through which the user can insert and remove the hologram card into and from the holder 25 with his or her finger are formed. The holder 25 can be attached to the cutout portion 14 in any of the portrait orientation and the landscape orientation.

Figure 9:
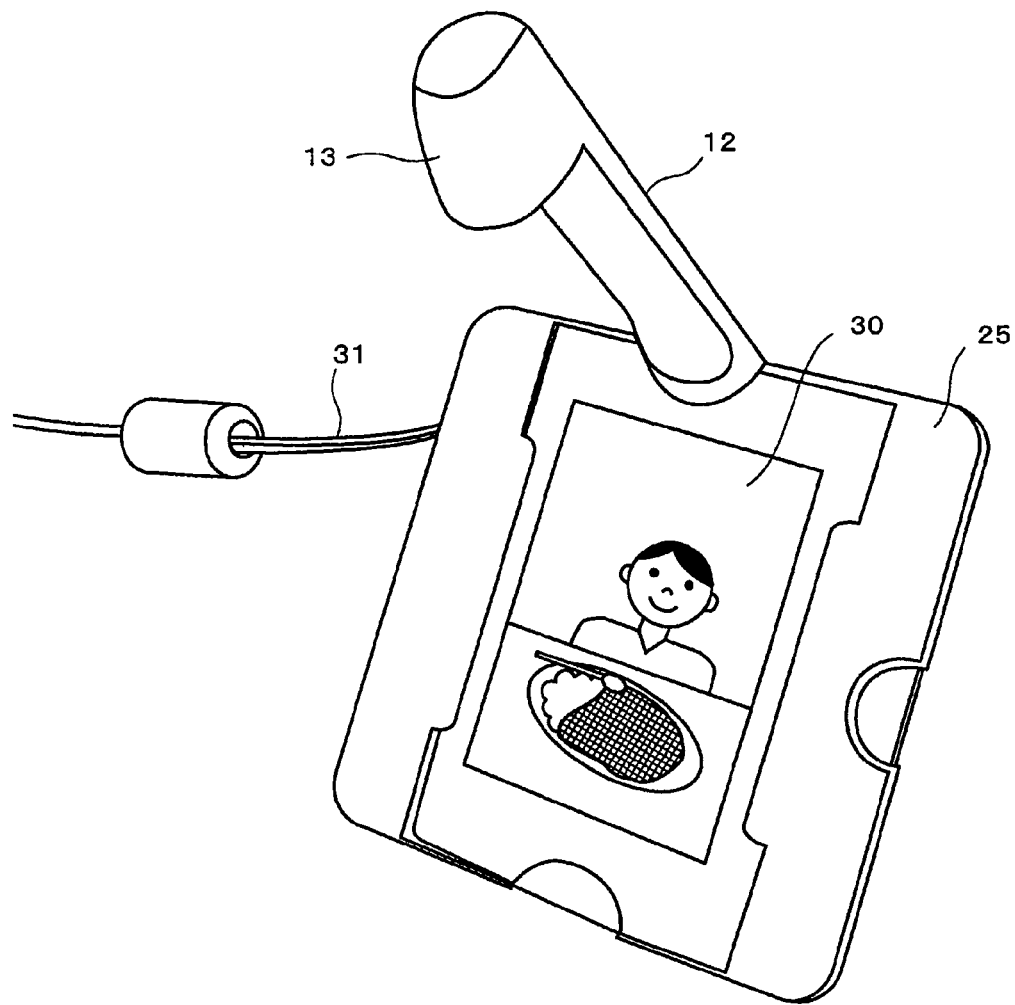
FIG. 9 is a perspective view showing a use state of the lighting apparatus according to the embodiment.

When the distance between the holding portion of the lighting apparatus and the end portion of the power supply housing section side is nearly the same as one side of the holder 25, a hologram card can be stably viewed. The holder 25 has a nearly square shape such that the lighting apparatus can stably light a lighting object in any of the portrait orientation and the landscape orientation even if the lighting object does not have an aspect ratio of 1:1, for example a trading card as shown in FIG. 9. In addition, the holder 25 has grooves through which a card can be inserted and secured.

In this embodiment, in the state that the hologram card 19 or the holder 25 is inserted into the cutout portion 14, the light source 16 is turned on. The light source 16 illuminates the hologram card 19 or a hologram held in the holder 25 with light. As a result, the user can view the hologram. The user can hold the power source housing section 11 with his or her hand to view a hologram. Instead, when the holder 25 and the lighting apparatus are placed such that the end of the holder 25 and the end portion of the power source housing section 11 are brought into contact with the surface where the lighting apparatus is placed, the user can view a hologram without necessity of holding the lighting apparatus with his or her hand. FIG. 9 shows the case that a hologram 30 is inserted into the holder 25, the contact portions instead of battery cells are inserted into the power source housing section 11, and the contact portions and the AC adaptor are connected with a cable 31.

In FIG. 5C, two-dotted line D that connects the end portion of the power source housing section 11 side and the end portion of the hologram card 19 represents the surface where the lighting apparatus is placed. It is preferred that the length from the cutout portion 14 to the end portion of the lighting apparatus, the length of one side of the hologram card 19, and the length of line D that connects the end portion of the lighting apparatus and the end portion of the hologram card 19 be nearly the same and form a right triangle viewed from one side of the lighting apparatus because the lighting apparatus is stably placed on a planar surface of for example a desk as shown in FIG. 9.

Figure 11A:
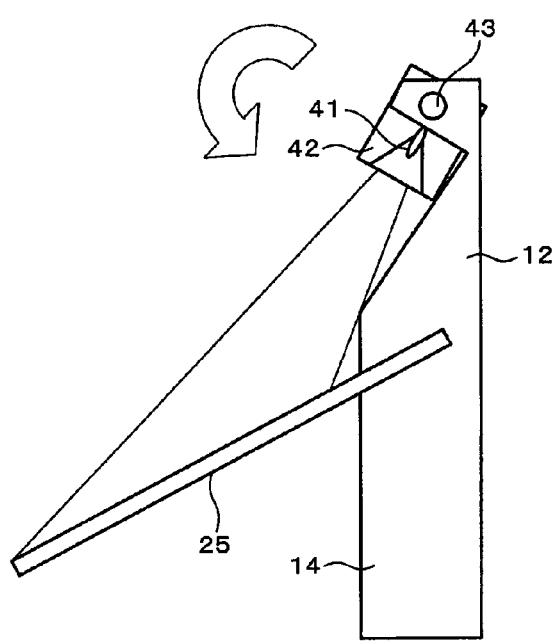
FIG. 11A and FIG. 11B are a side view and a rear view showing the lighting apparatus according to another embodiment in the case that the lighting apparatus operates in a second operation mode.
Figure 11B:
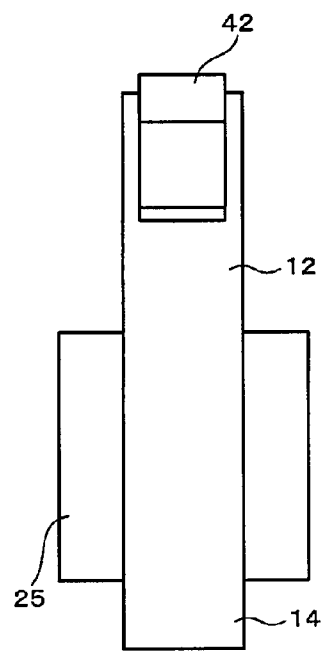
Figure 12A:
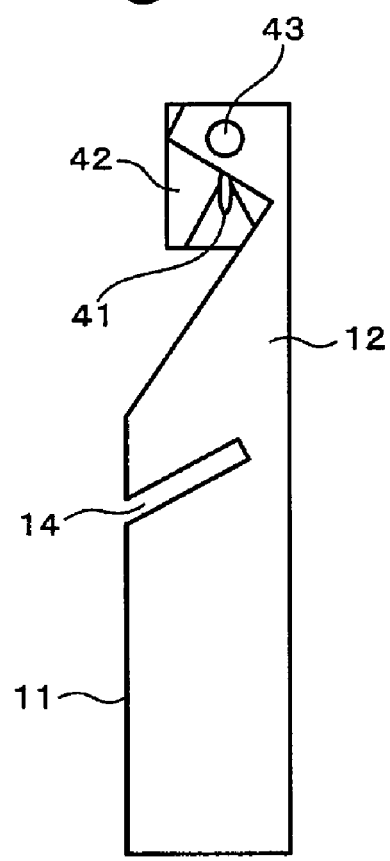
FIG. 12A and FIG. 12B are a side view and a rear view showing the lighting apparatus according to another embodiment in the case that the lighting apparatus operates in a third operation mode.
Figure 12B:
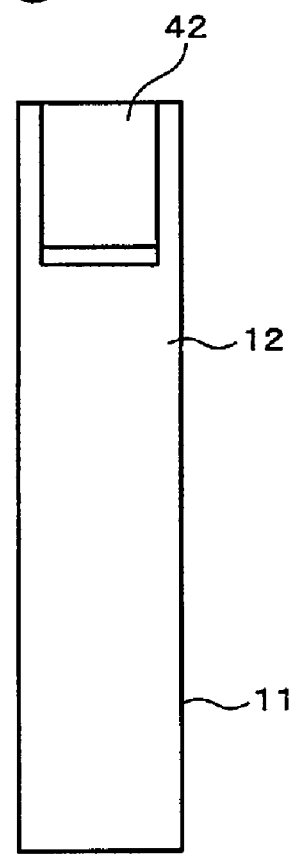

FIG. 10A and FIG. 10B, FIG. 11A and FIG. 11B, FIG. 12A and FIG. 12B, and FIG. 13A to FIG. 13C describe another embodiment. In this embodiment, a light source housing section 42 that houses a light source 41 is rotatable around a sleeve 43. The sleeve 43 is disposed between support plates perpendicular to the longitudinal direction of the sleeve 43. FIG. 10A and FIG. 10B, FIG. 11A and FIG. 11B, and FIG. 12A and FIG. 12B show three operation modes in this embodiment, respectively. FIG. 10A, FIG. 11A, and FIG. 12A are side views showing the lighting apparatus that operate in the respective operation modes. FIG. 10B, FIG. 111B, and FIG. 12B are rear views showing the lighting apparatus that operate in the respective operation modes.

In the first operation mode shown in FIG. 10A and FIG. 10B, the light source housing section 42 is rotated and then held such that the illuminating direction of the light source 41 faces outside. In this mode, the lighting apparatus is used as a regular pen light. To keep this rotation position, a rotatable leaf spring is disposed at a cutout portion between the support plates. The light source 41 is fixed at this position unless the orientation of the light source 41 is intentionally changed.

FIG. 11A and FIG. 11B show the second operation mode in which by manually rotating the light source housing section 42, a lighting object, for example the holder 25, is illuminated with light. The rotatable leaf spring also secures the light source housing section 42 at this rotation position.

FIG. 12A and FIG. 12B show the third operation mode in which by manually rotating the light source housing section 42, the light source housing section 42 is attached to the cutout portion between the support plates such that the illuminating direction of the light source 41 faces downward. In the third operation mode, the lighting apparatus is in the non-use state and the light source 41 is turned off.

In this embodiment, the lighting apparatus has not only an inner lighting function in which a hologram can be viewed, but also an outer lighting function for example as a pen light. Examples of the switch that switches on/off states of the light source include a sensor switch that is automatically controlled based on the rotation position of the light source housing section 42 as well as a manual operation switch.

Figure 13A:
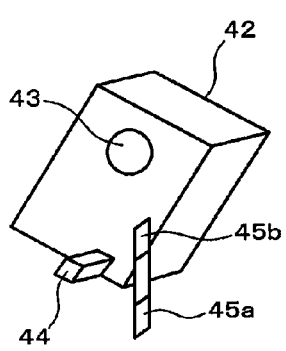
FIG. 13A, FIG. 13B, and FIG. 13C are schematic diagrams describing an example of a sensor switch according to another embodiment.
Figure 13B:
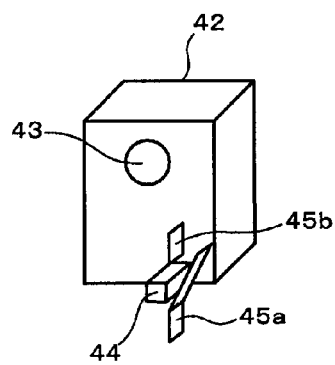
Figure 13C:
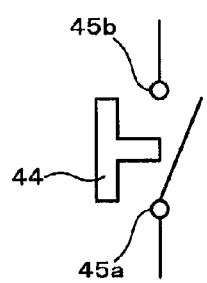

FIG. 13A to FIG. 13C show an example of such a sensor switch. The sensor switch includes a working protrusion 44 disposed on a side surface of the light source housing section 42, the working protrusion 44 being rotatable around the sleeve 43, and contacts 45a and 45b that are separated from each other (become an open state) when the working protrusion 44 is brought in contacts with them. In the second operation mode in which a hologram is illuminated (see FIG. 11A and FIG. 11B), as shown in FIG. 13A, the contacts 45a and 45b are brought into contact with each other. In the third operation mode in which the light source is in the non-use state (see FIG. 12A and FIG. 12B), as shown in FIG. 13B, the working protrusion 44 causes the contacts 45a an 45b to be separated from each other. As a result, the power to the light source 41 is stopped. FIG. 13C is a circuit diagram showing a circuit of the working protrusion 44 and the contacts 45a and 45b.

With such a sensor switch, in the case that the lighting apparatus is placed on a desk or the like, not held by user's hand, only when a hologram is viewed, it can be illuminated with light. As a result, power consumption of battery cells and AC power can be suppressed.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A lighting apparatus comprising:
   a power supply housing section which is composed of a cylindrical sleeve and which houses a battery cell or a contact portion, a shape of the contact portion being substantially similar to a shape of the battery cell, the contact portion being connected to an external AC adaptor;
   a circuit board housing section which extends from the power supply housing section and houses a circuit board, a part of a circumference surface of the sleeve being cut inwardly, a sectional area of the circuit board housing section being smaller than a sectional area of the power supply housing section;
   a light source housing section disposed at an end portion of the circuit board housing section;

a cutout portion formed into the circuit board housing section in the power supply housing section, the cutout portion configured such that a part of a planar and inflexible record medium on which a hologram image or a holographic stereogram image was recorded or a part of a holder which holds the record medium is able to be inserted into or removed from the cutout portion, the cutout portion being formed at a predetermined angle corresponding to an incident angle of reference light with which a hologram was recorded; and a light source which is housed in the light source housing section and which emits light in a direction toward a portion of the record medium or holder that extends outwardly from the cutout portion, wherein an image recorded on the record medium is displayed in a state such that when the record medium is secured to the cutout portion an end portion of the power supply housing section and the portion of the record medium or holder that extends outwardly from the cutout portion are configured to support the lighting apparatus in a designated position when the lighting apparatus and record medium are placed on a surface.

2. The lighting apparatus as set forth in claim 1, wherein the predetermined angle of the cutout portion is an angle of a line which connects the light source and a center of the record medium and a normal line of the record medium.

3. The lighting apparatus as set forth in claim 1, wherein the distance between the cutout portion and the end portion of the power supply housing section is substantially the same as a length of one side of the record medium.

4. The lighting apparatus as set forth in claim 1, further comprising:

a sensor switch which turns on and off the power supply, wherein when the record medium or the holder which holds the record medium is inserted into the cutout portion and the record medium or the holder is brought into contact with the sensor switch, the light source is turned on, and wherein when the record medium or the holder which holds the record medium is removed from the cutout portion and the record medium or the holder is separated from the sensor switch, the light source is turned off.

5. The lighting apparatus as set forth in claim 1, further comprising:

a manual control switch which turns on and off the light source, the manual control switch being manually operated.

6. The lighting apparatus as set forth in claim 1, further comprising:

a sensor switch which turns on and off the power supply; and a manual control switch which turns on and off the light source, the manual control switch being manually operated, wherein when the record medium or the holder which holds the record medium is inserted into the cutout portion and the record medium or the holder is brought into contact with the sensor switch, the light source is turned on, wherein when the record medium or the holder which holds the record medium is removed from the cutout portion and the record medium or the holder is separated from the sensor switch, the light source is turned off, and wherein only when both the sensor switch and the manual control switch are turned on, the light source is turned on.

7. The lighting apparatus as set forth in claim 1, further comprising:

an adjustment device which adjusts brightness of the light source, the adjustment device being disposed on the circuit board housed in the circuit board housing section, holes being formed in the circuit board housing section, the adjustment device being operated from outside of the circuit board housing section through the holes.

8. The lighting apparatus as set forth in claim 1, wherein the light source is rotatable around a sleeve perpendicular to a line which connects the power supply housing section, the circuit board housing section, and the light source housing section, and wherein a light illuminating direction of the light source is fixed at least at one position as well as a position at which the record medium is illuminated.

* * * * *